Figure 3:
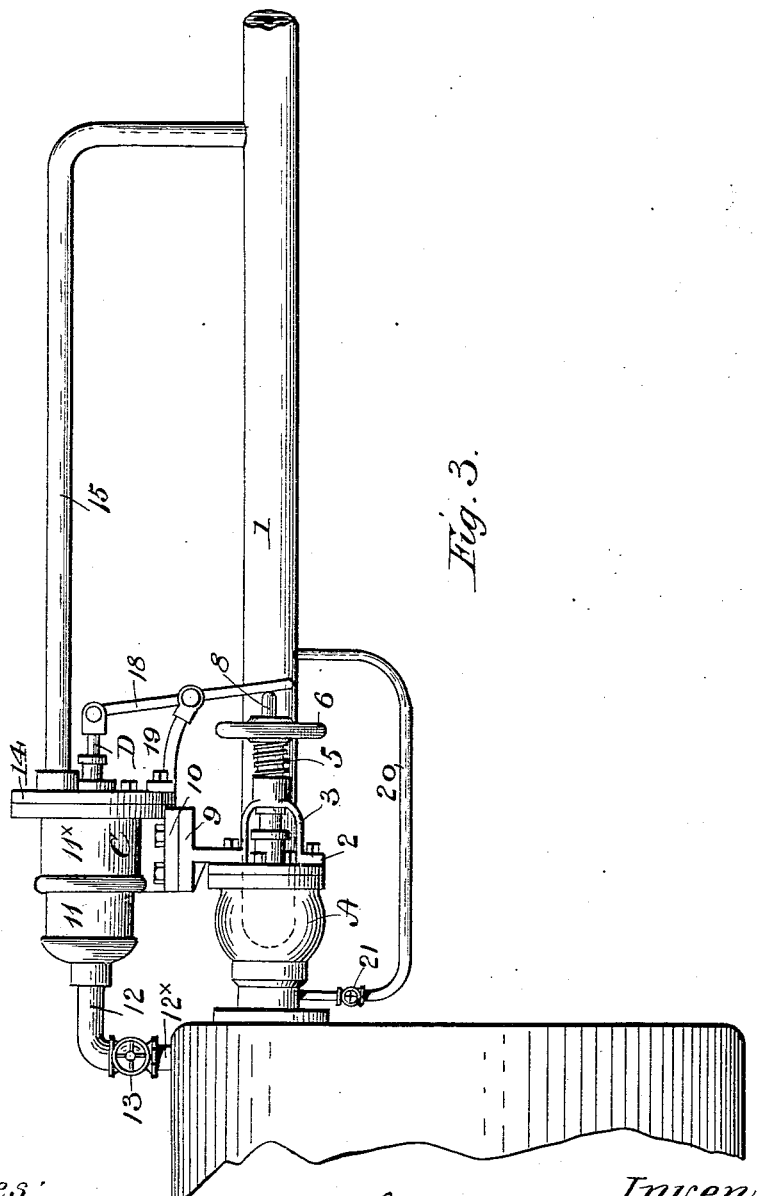

(No Model.)
2 Sheets—Sheet 1.
G. J. N. CARPENTIER.
SAFETY DEVICE FOR STEAM BOILERS.
No. 559,995. Patented May 12, 1896.
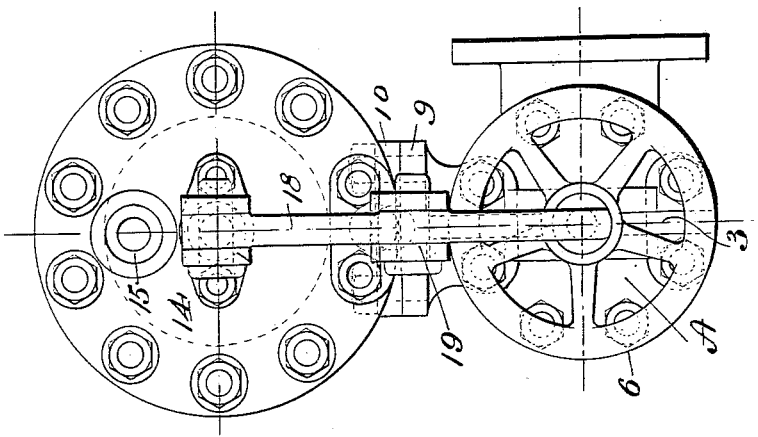
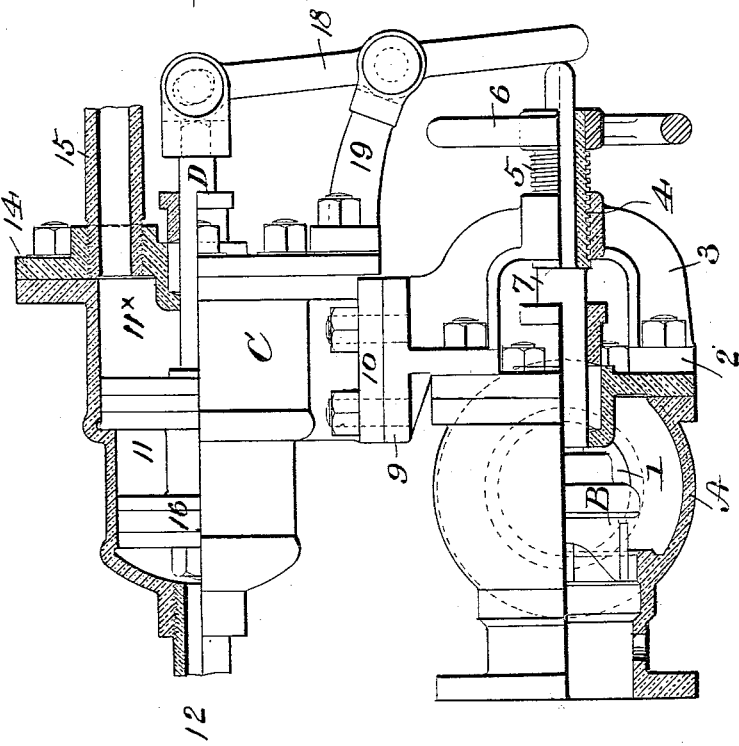
Witnesses:
F. L. Ourand
A. G. Huffman
Inventor,
Georges J. N. Carpentier
by J. M. Yznaga.
Attorney.

(No Model.) 2 Sheets—Sheet 2.

G. J. N. CARPENTIER.
SAFETY DEVICE FOR STEAM BOILERS.

No. 559,995. Patented May 12, 1896.

Witnesses:
Franck L. Ourand.
A. G. Heysinn.

Inventor
Georges J. N. Carpentier
by J. M. Yznaga.
Attorney.

UNITED STATES PATENT OFFICE.

GEORGES J. N. CARPENTIER, OF NEWPORT NEWS, VIRGINIA.

SAFETY DEVICE FOR STEAM-BOILERS.

SPECIFICATION forming part of Letters Patent No. 559,995, dated May 12, 1896.

Application filed February 19, 1896. Serial No. 579,854. (No model.)

*To all whom it may concern:*

Be it known that I, GEORGES J. N. CARPENTIER, a citizen of the United States, residing at Newport News, in the county of Warwick and State of Virginia, have invented certain new and useful Improvements in Safety Devices for Steam-Boilers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in safety devices for steam-boilers; and the object is to construct and provide a device or mechanism whereby in the case of the steam-pipe leading to the engine bursting the steam from the boiler will be automatically shut off and the escape of steam entirely prevented.

I accomplish the object of my invention by the means illustrated in the accompanying drawings, forming a part of this specification, wherein—

Figure 1 is a plan view, partly in section, of the device. Fig. 2 is an end view thereof. Fig. 3 shows the device as operatively fixed to a steam-boiler.

It will be premised that while I have illustrated the device as fixed to the head of a steam-boiler of a well-known construction it is apparent that it may be interposed and arranged in other positions, the primary purpose being to take steam from the boiler into the cylinder and to connect the pistons in the cylinder to operate the stop-valve in the steam-pipe.

Referring to the drawings, A designates the casing of the stop cock or valve, having suitable connection to the steam-pipe 1, leading to the engine. (Not shown.) To the outer end of the valve-shell is suitably secured a bracket 2, formed with a yoke 3, in the middle of which is formed a screw-threaded opening 4, in which is fitted a screw 5, provided with a hand-wheel 6 to turn the end of the screw down on and from the shoulder of the valve-stem to shut or open the valve.

B designates the shut-off valve, which may be of any suitable design adapted to close and open the steamway in the valve-chamber. The valve-stem 7 is slidingly arranged in proper packing and has its outer portion 8 reduced in diameter and projected through the bore formed in the screw 5, so that the end of the reduced portion of the valve-stem will project a sufficient distance beyond the outer end or head of the screw to be operatively engaged by the lever, substantially as shown in Fig. 1 of the drawings. A seat 9 is formed on the bracket 2, against which and to which the frame of the piston-cylinder is secured by bolts, as shown in the drawings.

C designates the piston-cylinder, formed with a laterally-extended plate 10 to set against and be secured to the seat 9. The piston-cylinder is formed with two piston-chambers 11 $11^\times$, of different diameters, the larger being at the outer portion of the cylinder, as shown in the drawings. In the inner end of the cylinder is fitted a pipe 12, leading from the boiler, as at $12^\times$, and provided with a valve or turning plug 13, which is always open, except when intentionally closed at times when the device is not to be called into use or requisition. On the outer end of the cylinder is fitted and secured a cylinder-head 14, through which the piston-rod is slidingly arranged and fitted in any well-known manner. At a convenient point in the cylinder-head is let in and secured a pipe 15, the other end of which is secured in the steam-pipe, substantially as shown, through which steam is admitted to the cylinder from the steam-pipe.

D designates the piston-rod, on the end of which is secured a piston-head 16, fitting the smaller chamber of the cylinder, and at a determined point on the piston-rod is another piston-head 17, fitting the larger chamber of the cylinder and arranged on the piston-rod to suit the stroke required. On the projecting end of the piston-rod is pivotally connected one end of a lever 18, fulcrumed in an arm 19, projecting from the cylinder-head or other suitable support provided. The lever 18 extends down, as shown, and engages against the projecting end of the valve-stem, as shown in Figs. 1 and 3.

It will now be perceived from the foregoing description, taken in connection with the drawings, that in the ordinary action of the steam the pressure on the right-hand face of the larger piston-head 17 through the pipe leading back from the steam-pipe is to keep the piston in the position shown in Fig. 1 of the drawings, and the lever will be pushed outwardly by the stem of the stop-valve; but should a pipe burst the pressure on the piston-head 17 will be immediately removed and the pressure on the smaller piston-head 16 assert its power and prevail in moving the piston outwardly, carrying the connected end of the lever with it and moving the other end of the lever, which is lodged against the end of the shut-off-valve stem, inwardly, moving the valve to close the steam-pipe, and this immediately stops the flow of steam through the bursted pipe.

A small "by-pass" pipe 20 is provided, having one end opening from the stop-valve and the other opening into the steam-pipe, and in this by-pass pipe is a stop-cock 21, to be manipulated by the engineer, as occasion may require, to equalize the pressure and permit a preliminary flow or charge of steam to the steam-pipe to act on the larger piston-head and drive it back. The valve 21 is closed and remains closed after the stop-valve is opened.

It will be observed that the area of the smaller cylinder and piston-head must be larger than the area of the stop-valve in the steam-pipe in order that the former will overcome the pressure in the latter.

Having thus described my invention, what I claim, and desire to secure by Letters Patent, is—

1. A safety device for steam-boilers, comprising a valve in the path of the steam-pipe, a cylinder having chambers of different diameters, a pipe connection with the boiler opening into the smaller chamber of the cylinder, a pipe connection from the larger chamber to the steam-pipe, a piston in the cylinder having heads of different diameters to fit the chambers in the cylinder, and a lever on the end of the piston-rod to operate the valve in the path of the steam-pipe.

2. A safety device for steam-boilers, comprising a stop-valve in the steam-pipe, a guide for the stem of the valve, a cylinder having steam-chambers of different diameters, and having steam-ports in connection with the boiler and steam-pipe, a piston in the cylinder having two heads to fit the respective chambers in the cylinder, and a lever operated by the piston-rod to move the stop-valve, substantially as set forth.

3. In a safety device for a steam-boiler, the combination with the boiler and the steam-pipe of a stop-valve suitably mounted to admit and cut off the steam from the boiler and formed with a stem, a guide for the stem, a cylinder having connection to the boiler and steam-pipe, and having steam-chambers of different diameters, a piston-rod carrying piston-heads for each steam-chamber, and a lever on the piston-rod to act on the valve-stem, substantially as set forth.

In testimony whereof I affix my signature in presence of two witnesses.

GEORGES J. N. CARPENTIER.

Witnesses:
A. G. HEYLMUN,
ADOLPH G. WOLF.